United States Patent
Guyon

(10) Patent No.: US 6,273,499 B1
(45) Date of Patent: Aug. 14, 2001

(54) VEHICLE HEADLINER

(75) Inventor: Patrick Guyon, Levis Saint-Nom (FR)

(73) Assignee: Company Sylea, Montigny le Bretonneux (FR)

( * ) Notice: Subject to any disclaimer, the term of this patent is extended or adjusted under 35 U.S.C. 154(b) by 0 days.

(21) Appl. No.: 09/532,664

(22) Filed: Mar. 21, 2000

(30) Foreign Application Priority Data

Mar. 22, 1999 (FR) .................................................. 99 03524

(51) Int. Cl.⁷ .................................................. H01R 25/14
(52) U.S. Cl. ........................ 296/214; 174/72 A; 439/34
(58) Field of Search .............................. 296/214; 439/34; 174/72 A

(56) References Cited

U.S. PATENT DOCUMENTS

| | | | | |
|---|---|---|---|---|
| 4,848,829 | * | 7/1989 | Kidd | 296/152 |
| 5,309,634 | * | 5/1994 | Van Order et al. | 29/863 |
| 5,484,186 | | 1/1996 | Van Order et al. | 296/97.5 |
| 5,501,605 | * | 3/1996 | Ozaki et al. | 439/34 |
| 5,598,627 | * | 2/1997 | Saka et al. | 29/861 |
| 5,688,022 | * | 11/1997 | Adams et al. | 296/214 |
| 5,846,091 | * | 12/1998 | Nishijima et al. | 439/34 |
| 5,931,682 | * | 8/1999 | Takiguchi et al. | 439/34 |
| 6,036,501 | * | 3/2000 | Wojewnik et al. | 439/34 |
| 6,095,840 | * | 8/2000 | Yamaguchi et al. | 439/247 |
| 6,142,556 | * | 11/2000 | Tanaka et al. | 296/146.7 |
| 6,191,364 | * | 2/2001 | Byrne | 174/72 A |

FOREIGN PATENT DOCUMENTS

| | | | |
|---|---|---|---|
| 196 49 972 A1 | 5/1998 | (DE) . | |
| 346154 | * 12/1989 | (EP) | 296/214 |
| 0 440 836 A1 | 8/1991 | (EP) . | |
| 0 872 384 A2 | 10/1998 | (EP) . | |
| 2 762 719 | 10/1998 | (FR) . | |

* cited by examiner

Primary Examiner—D. Glenn Dayoan
Assistant Examiner—Paul Chenevert
(74) Attorney, Agent, or Firm—Pearne & Gordon LLP

(57) ABSTRACT

A textile material automotive vehicle headliner includes a number of electrical accessories such as overhead lights, loudspeakers and brake light repeaters. It is formed of a plurality of thicknesses between which are inserted a main ribbon conductor having a series of tracks and secondary conductors having tracks. Openings are formed in the thicknesses of material corresponding to the locations of the accessories. The ribbon conductors extend into the openings. The accessories are electrically connected to corresponding ribbon conductors and fixed into a corresponding opening. One of the accessories connects the main ribbon conductor to a power supply of the vehicle.

3 Claims, 7 Drawing Sheets

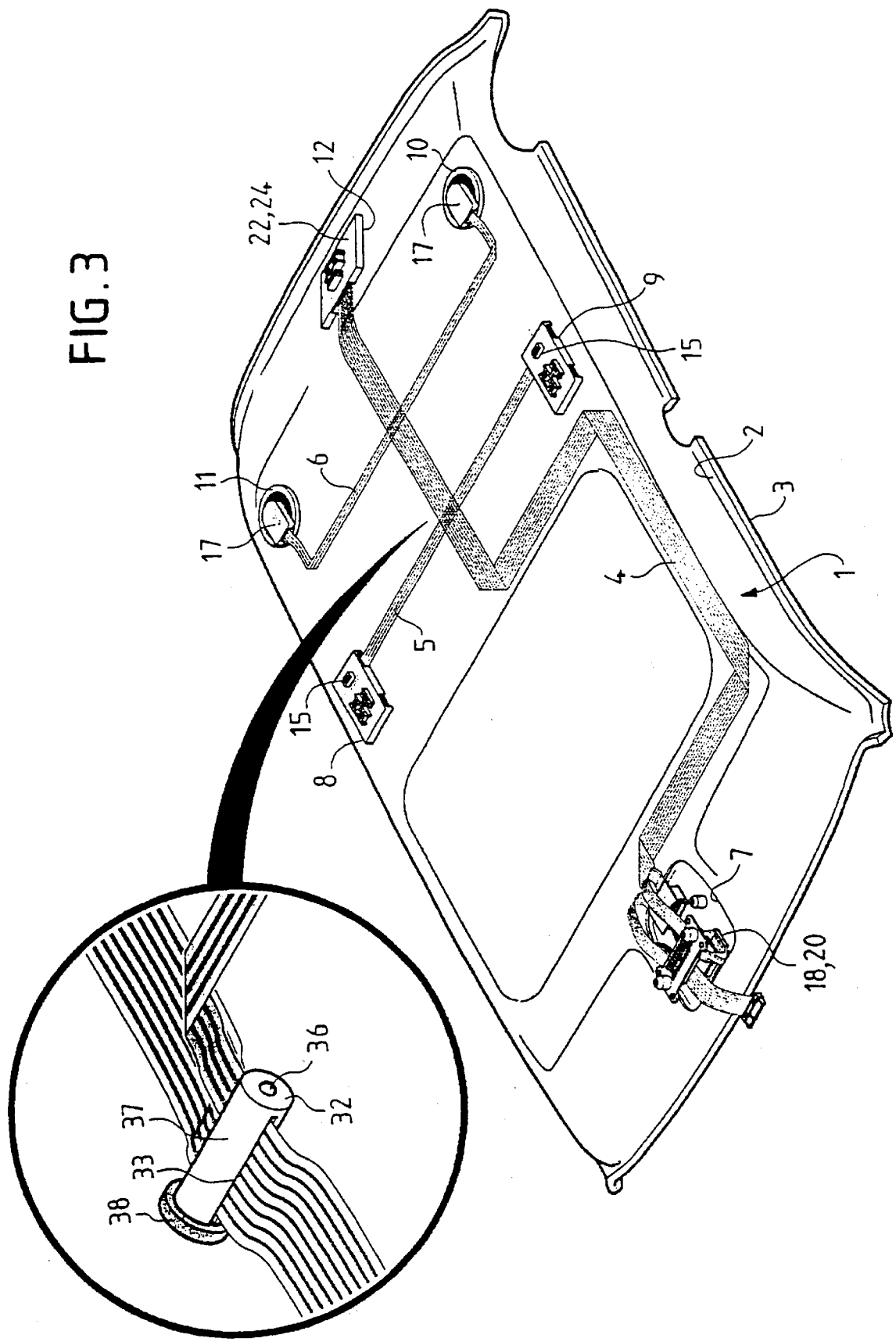

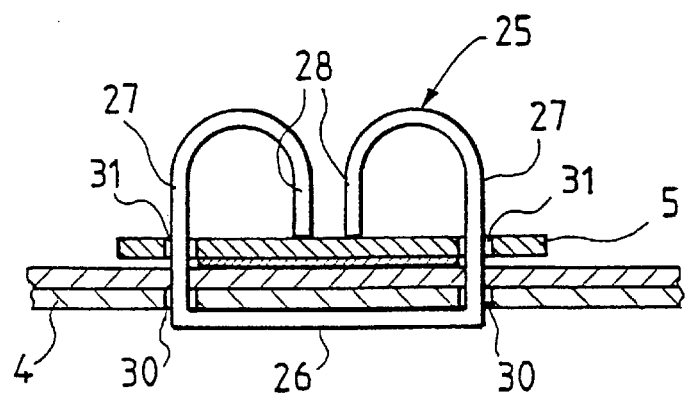
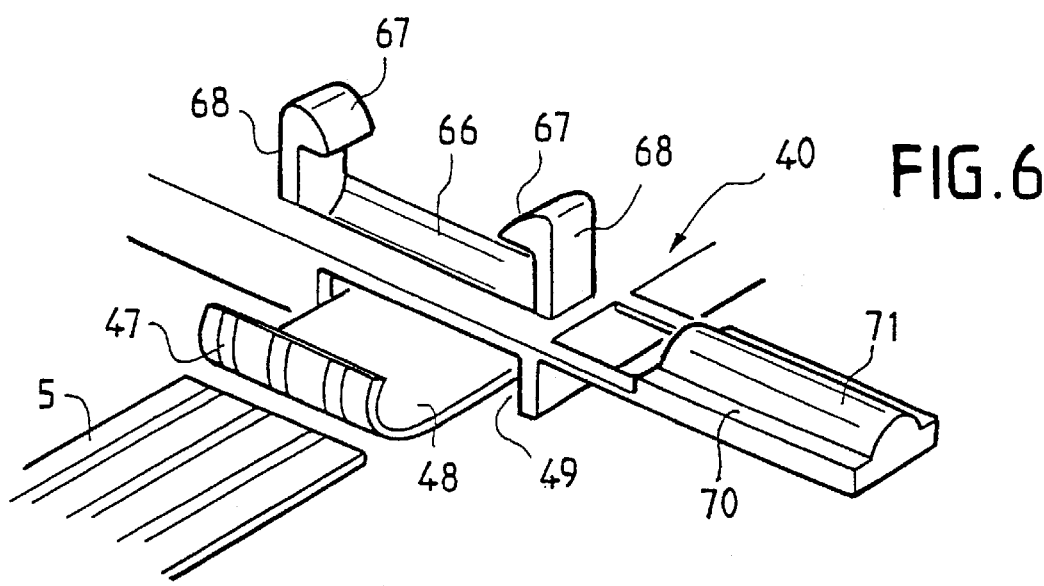
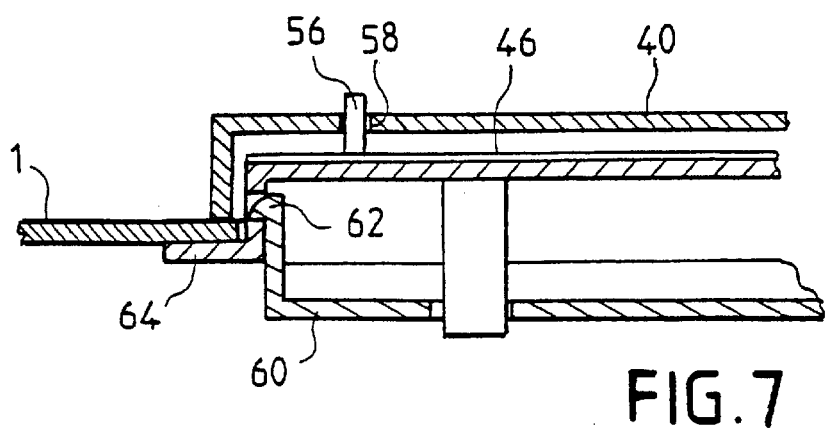

VEHICLE HEADLINER

BACKGROUND OF THE INVENTION

1. Field of the Invention

The present invention relates to a vehicle headliner.

2. Description of the Prior Art

Vehicle headliners are generally made from a textile material which is fixed to the roof and on which various electrical accessories are mounted, such as overhead lights, a brake light repeater, loudspeakers, etc.

Generally, such accessories are connected to wiring provided to power them and are then fixed into place, which represents considerable labor.

One object of the invention is to remedy this drawback.

SUMMARY OF THE INVENTION

The invention provides a textile material automotive vehicle headliner including a number of electrical accessories such as overhead lights, loudspeakers and brake light repeaters and formed of a plurality of thicknesses between which are inserted a main ribbon conductor having a series of tracks and secondary conductors having tracks, wherein openings are formed in the thicknesses corresponding to the location of the accessories, the ribbon conductors extend into the openings, the accessories are adapted to be electrically connected to corresponding ribbon conductors and to be fixed into a corresponding opening, and one of the accessories includes means for connecting the main ribbon conductor to a power supply of the vehicle.

A complete headliner can therefore be manufactured ready to be fitted, at which time all the pre-wired accessories are automatically connected to the power supply circuit of the vehicle.

The headliner preferably includes a support for the electrical accessories having a rim adapted to cooperate with the surface of the headliner adjacent the opening, a flexible printed circuit for powering the electrical accessories, a plate which has compartments to receive contacts of the electrical accessories and means or assembling the support to the plate with the surface adjacent the opening in the headliner clamped between the plate and the rim. The accessories can therefore be connected quickly to the ribbon conductors and fixed to the headliner.

According to one feature of the invention the plate includes means for electrically connecting the ribbon conductor to the flexible printed circuit for powering the electrical accessories.

According to another feature of the invention the plate includes a hinged flap, means for locking the flap and an extension of the flexible printed circuit for powering the electrical accessories, the ribbon conductor can be clamped between the flap and a bearing surface and the extension includes power supply tracks intended to coincide with the tracks of the ribbon conductor.

The bearing surface preferably includes a trough and the flap preferably includes a corresponding protuberance.

According to a final feature of the invention one of the electrical accessories includes a connector element, a complementary connector element is fixed to the roof of the vehicle and connected by conductors to an electrical power supply circuit of the vehicle and the elements include contacts adapted to be pressed together after insertion of the main ribbon conductor in order to supply power thereto. Thus the ribbon conductor is inserted between the terminals of the two connector elements when fitting the headliner and all the accessories are therefore connected automatically.

The invention will now be described in more detail, by way of example only and with reference to one particular embodiment shown in the accompanying drawings.

BRIEF DESCRIPTION OF THE DRAWINGS

FIG. 3 is a perspective view showing electrical connections between the various ribbon cables of the headliner.

FIG. 4 is a sectional view showing a ribbon cable connecting device.

FIG. 6 is a perspective view of the electrical connections to the overhead light shown in FIG. 5.

FIG. 7 is a sectional view showing the overhead light.

DETAILED DESCRIPTION OF THE PREFERRED EMBODIMENTS

Figure 1:
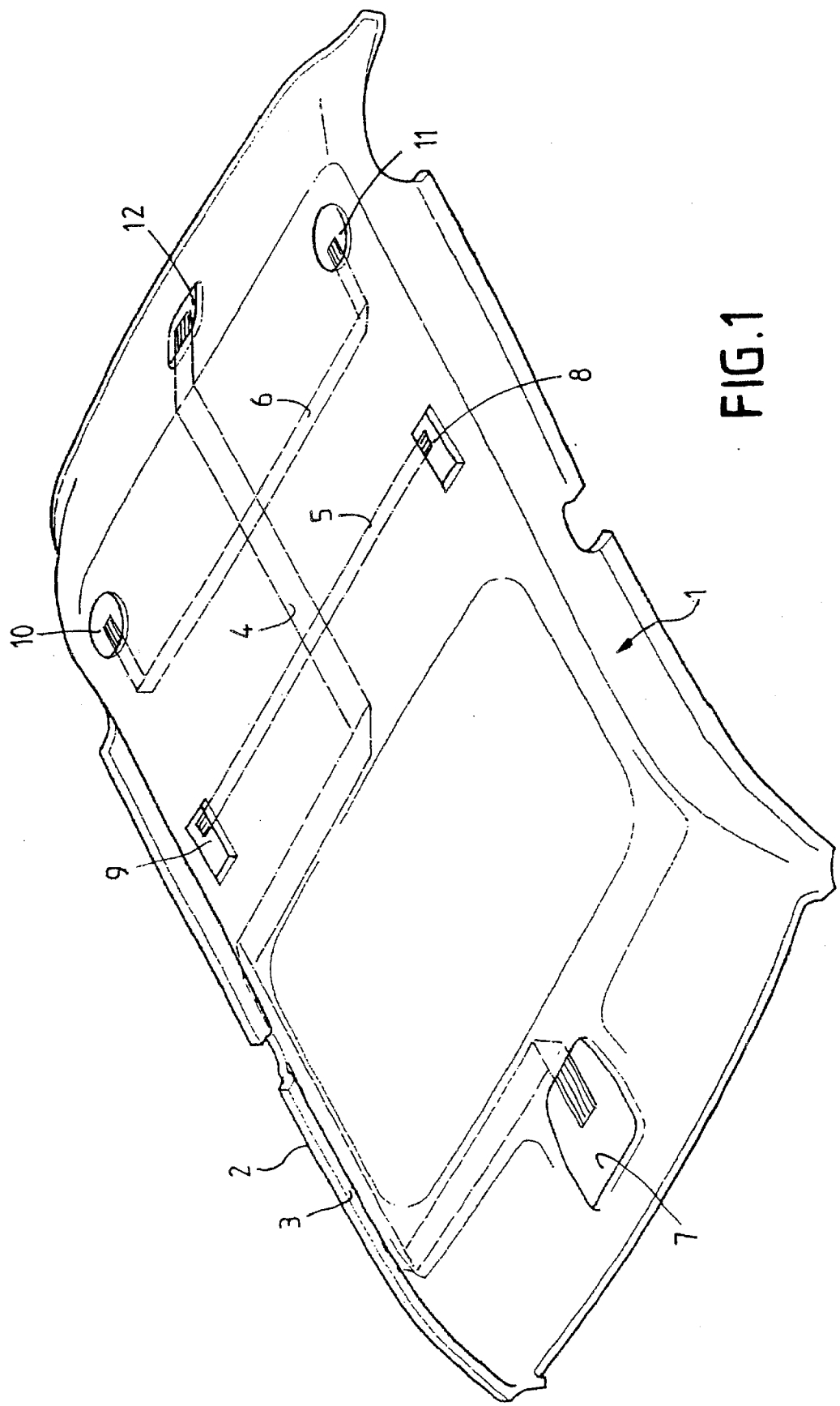
FIG. 1 is a perspective view of a vehicle headliner during its manufacture.

FIG. 1 shows a headliner 1 which is made up of several thicknesses of textile material 2, 3 between which are inserted a set of main ribbon conductors 4 with several conductive tracks and secondary ribbon conductors 5 and 6.

The headliner incorporates openings 7, 8, 9, 10, 11 and 12; all of the ribbon conductors 4 extend into the openings 7 and 12, the ends of the conductor 5 extend into the openings 8 and 9 and the ends of the conductor 6 extend into the openings 10 and 11.

Figure 2:
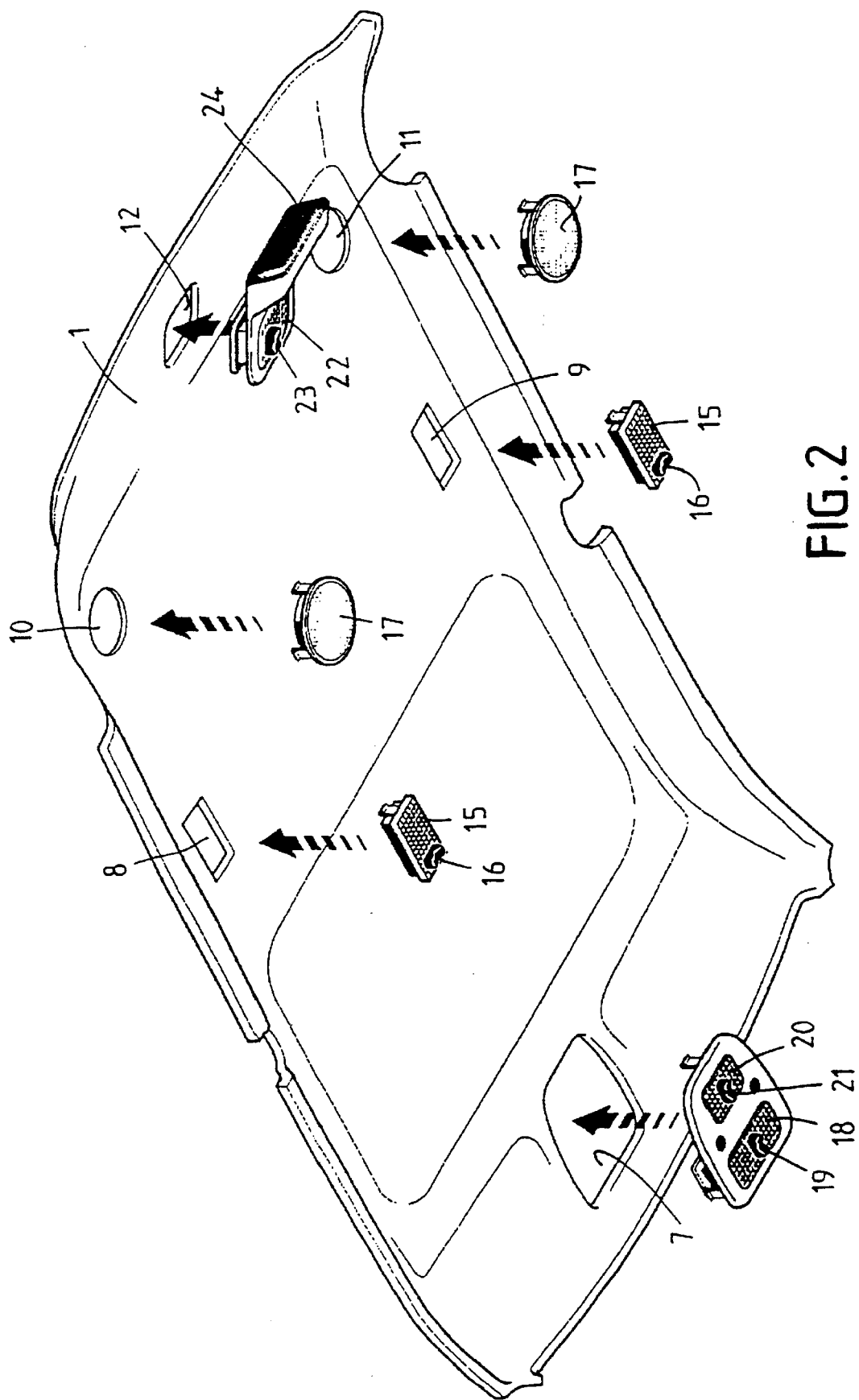
FIG. 2 is a perspective bottom view of the headliner shown in FIG. 1 before the various electrical accessories are fitted.

As shown in FIG. 2, the openings 8 and 9 are intended to receive overhead lights 15 which incorporate a switch 16 and the openings 10 and 11 are intended to receive loudspeakers 17 of a radio in the vehicle.

The opening 7 is intended to receive an assembly comprising an overhead light 18 with a switch 19 and a card reader 20 with a switch 21.

The opening 12 is intended to receive an overhead light 22 with a switch 23 and a vehicle brake light repeater 24.

As shown in FIG. 3, the main ribbon conductor 4 must be electrically connected to the secondary ribbon conductors 5 and 6.

The latter can be connected with simple U-shaped clips 25 having a web 26 with flanges 27 extended by rims 28. The flanges pass through holes 30 in the insulation and the corresponding track and the flanges 27 pass through holes 31 on respective opposite sides of the track of the conductor 6, the rims 28 pressing the corresponding tracks together (see FIG. 4).

The conductor 4 can also be connected to the conductor 5 by a member 32 having a shaft 36 attached at one end to a button 38 and housed in a sleeve 37 with a slot 33 in it; the conductors are inserted into the slot and the sleeve is turned on the shaft so that the tracks of the conductors are pressed together.

Figure 5:
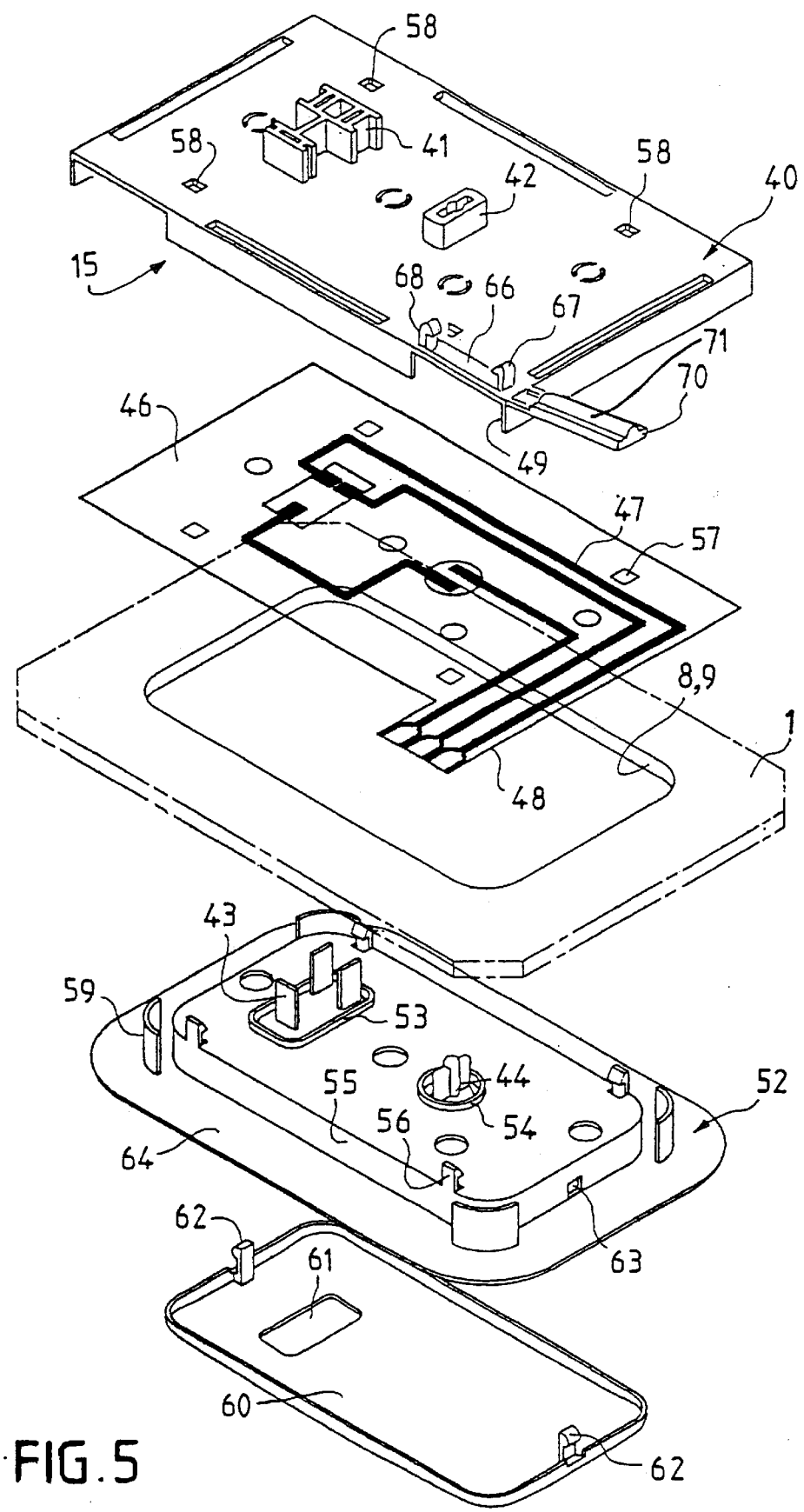
FIG. 5 is an exploded perspective view of an overhead light.

FIG. 5 is an exploded perspective view of the overhead light 15, which includes a plate 40 with compartments 41 to receive contacts 43 of the switch 16 and compartments 42 to receive contacts 44 of a lamp.

A flexible circuit 46 including tracks 47 for supplying power to the lamp via the switch is disposed against the bottom face of the plate 40 and has an extension 48 designed to be passed through an opening 49 in the plate 40.

The ends of the tracks 47 intended to cooperate with the contacts 43 and 44 are inserted therewith into the corresponding compartments 41 and 42 to make the electrical connections.

The plate 40 is pressed directly onto the headliner 1 in the vicinity of the opening 8 or 9.

A support 52 includes members 53 to receive the switch 16 and members 54 to receive the contacts 44 of the lamp, said support having a projecting part 55 and centering members 59 extending from a rim 64.

The projecting part 55 includes hooks 56 which are intended to pass through holes 57 in the circuit 46 and holes 58 in the plate 40. The members 59 cooperate with the edge of the openings 8, 9 to fix the support to the plate.

Finally, the support 52 receives a diffuser 60 having an opening 61 through which the switch 16 passes and two hooks 62 cooperating with openings 63 in the part 55 of the support 52.

The overhead lamp 15 is mounted in the opening 8 or 9, the members 59 engage therein and the circuit 46 and the plate 40 are disposed on the face of the headliner 1 intended to espouse the roof of the vehicle and the headliner 1 is therefore gripped between the rim 64 and the plate 40.

The overhead light 15 is connected to the ribbon conductor 5 whose ends extend into said openings before fixing it into the opening 8 or 9. FIG. 6 shows how the electrical connections are made.

The plate 40 has a trough-shaped bearing surface 66 near the opening 49 and the ends of two elastic lugs 68 at the ends of this housing carry hooks 67 facing toward each other.

A flap 70 with a protuberance 71 corresponding to the shape of the trough 66 is articulated to an edge adjacent the opening 49.

To make the electrical connections, the end 48 is folded between the lugs 68, the ribbon conductor 5 is then pressed onto it so that its tracks coincide with the tracks 47 and the flap 70 is then bent over and locked between the hooks 67. The conductors are therefore clamped between the bottom of the trough 66 and the Protuberance 71.

Figure 8:
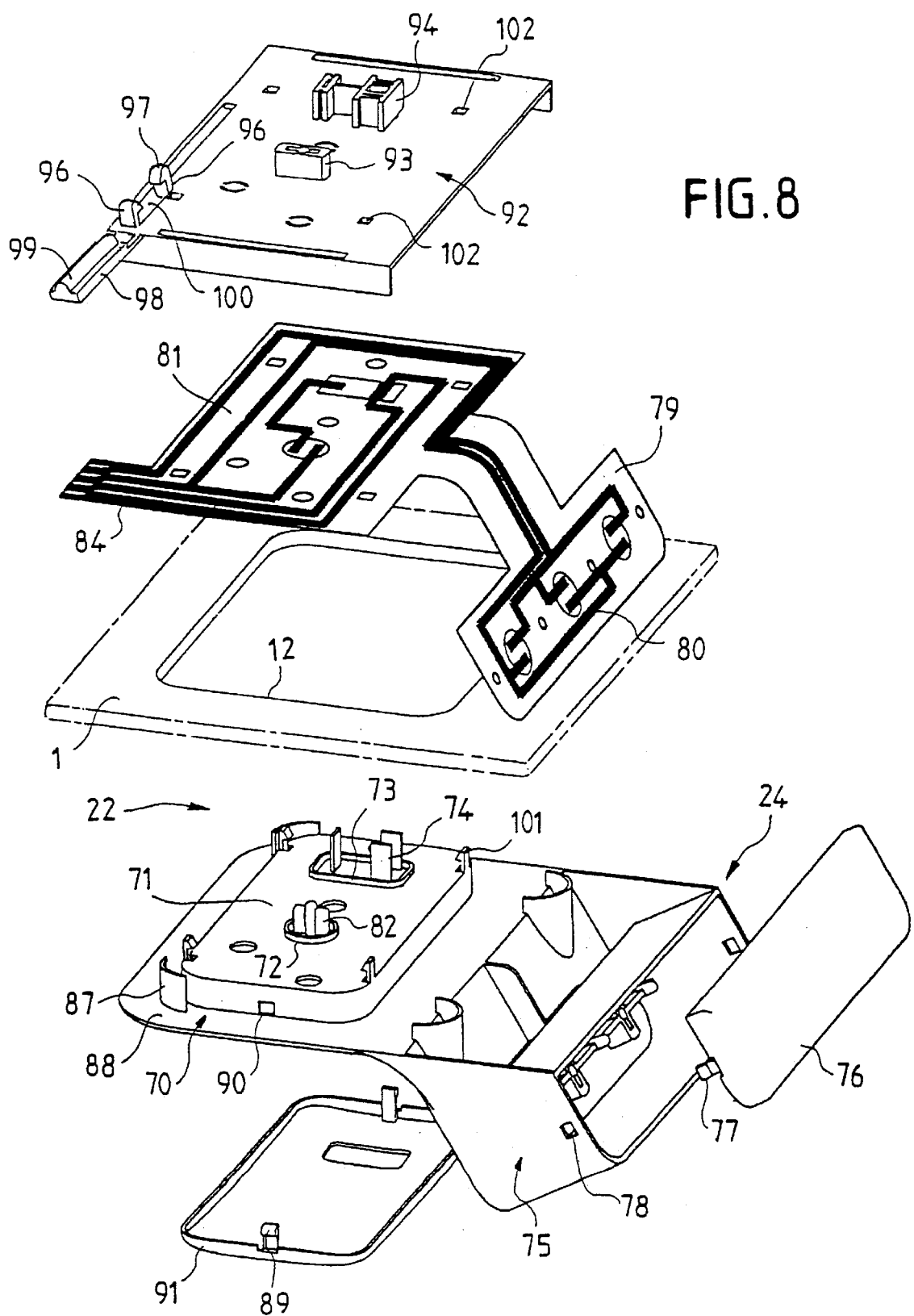
FIG. 8 is an exploded perspective view of a variant of the overhead light shown in FIG. 5.

FIG. 8 is an exploded perspective view of the overhead light 22 with the brake lamp repeater 24. The overhead light includes a support 70 with a projecting part 71 carrying respective members 72 and 73 for receiving a lamp and the switch 23 and whose contacts 74 and 82 project from the surface of the projecting part 71. The support 70 is extended by a receptacle 75 closed by a diffuser 76 which has hooks 77 engaging in holes 78. The receptacle 75 is intended to contain three lamps and receives a portion 79 of a printed circuit 81 whose tracks 80 power said lamps.

The printed circuit 81 is intended to power the lamp of the overhead light via the switch 23 and has an extension 84.

The support 70 has guides 87 upstanding from a rim 88 of the support 70 and the portion 79 of the printed circuit passes through said opening 12 and is housed in the receptacle 75.

A diffuser 91 with hooks 89 inserted in holes 90 in the projecting portion 71 is mounted on the support 70.

The assembly is completed by a plate 92 with respective compartments 94 and 93 intended to receive contacts 74 and 82 of the switch and the lamp, which contacts cooperate with the corresponding tracks of the circuit 81.

As for the circuit 81, the extension 84 passes through an opening in the plate 92 and, together with the ribbon conductor 4, is inserted between elastic lugs 96 terminating in hooks 97 for immobilizing by a flap 98 with a protuberance 99 which engages in a trough-shaped bearing surface 100.

Thus the electrical connections are made in the same way as for the overhead light 15.

The guide members 87 are inserted in the opening 12 whose edge cooperates with the rim 88, the plate 92 rests on the side of the headliner 1 intended to face toward the roof and the assembly is locked by hooks 101 passing through holes 102 in the plate 92.

Figure 9:
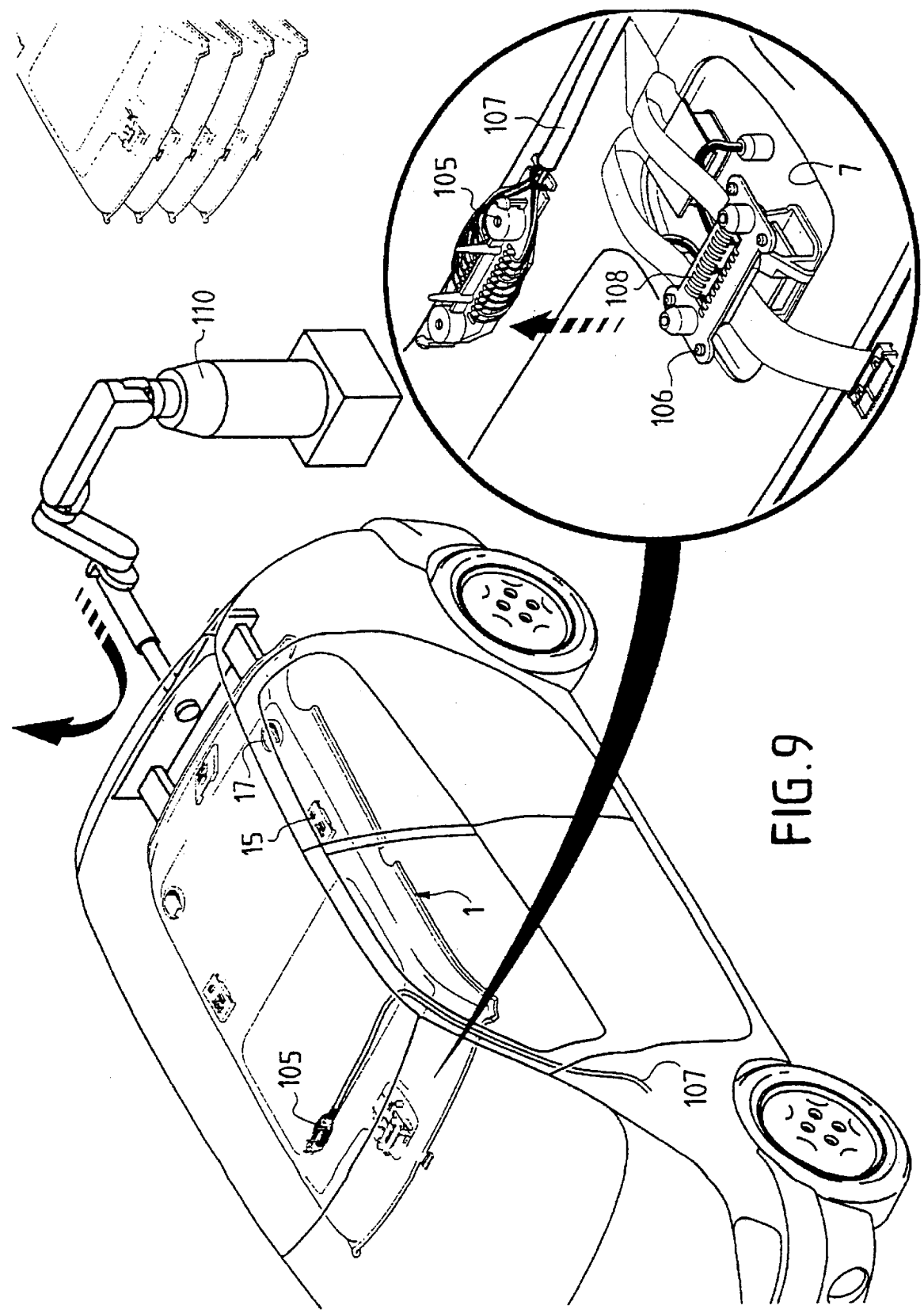
FIG. 9 is a perspective view showing how the headliner is assembled to the roof.

The overhead light 18 is mounted in the opening 7 in the headliner 1 in the same way as the overhead lights 15 and 22 (see FIG. 9); however, this overhead light is fastened to a connector element 106 and a complementary electrical connector element 105 is fixed to the roof of the vehicle and connected to the battery of said vehicle by a cable with a series of conductors 107.

The element 105 has means for fixing the conductors 107 and which are connected to contacts intended to cooperate with contacts 108 of the element 106, the ribbon conductor 4 being inserted between these contacts to power the various accessories supported by the headliner 1. The two elements 105 and 106 are screwed together, for example.

The headliner 1 is shipped with all the overhead lights, loudspeakers, etc. mounted in the corresponding openings and connected to the ribbon conductors 4, 5 and 6, the headliner is placed against the roof by a robot 110 and all the electrical connections are made by inserting the ribbon conductor 4 between the contacts of the connector elements 105 and 106.

The loudspeakers 17 can be made in the same manner as the other accessories 15, 22 so that they can be connected and fitted very quickly and very easily.

Of course, the invention is not limited to the embodiment shown and just described. Many modifications could be made to details thereof without departing from the scope of the invention.

What is claimed is:

1. A textile material automotive vehicle headliner including a number of electrical accessories and formed of a plurality of thicknesses between which are inserted a main ribbon conductor having a series of tracks and secondary conductors having tracks, wherein openings are formed in said thicknesses corresponding to the location of said electrical accessories, said ribbon conductors extend into said openings, said electrical accessories are adapted to be electrically connected to corresponding ribbon conductors and to be fixed into a corresponding opening, and one of said electrical accessories includes means for connecting said main ribbon conductor to a power supply of said vehicle, said headliner including a support for said electrical accessories having a rim adapted to cooperate with the surface of said headliner adjacent said opening, a flexible printed circuit for powering said electrical accessories, a plate which has compartments to receive contacts of said electrical accessories and means for assembling said support to said plate with said surface adjacent said opening in said headliner clamped between said plate and said rim, said plate includes a hinged flap, means for locking said flap and an extension of said flexible printed circuit for powering said electrical accessories, said ribbon conductor can be clamped between said flap and a bearing surface and said extension includes power supply tracks intended to coincide with said tracks of said ribbon conductor.

2. The headliner claimed in claim 1 wherein said bearing surface includes a trough and said flap includes a corresponding protuberance.

3. A textile material automotive vehicle headliner including a number of electrical accessories and formed of a plurality of thicknesses between which are inserted a main ribbon conductor having a series of tracks and secondary conductors having tracks, wherein openings are formed in said thicknesses corresponding to the location of said accessories, said ribbon conductors extend into said openings, said accessories are adapted to be electrically connected to corresponding ribbon conductors and to be fixed into a corresponding opening, and one of said accessories includes means for connecting said main ribbon conductor to a power supply of a vehicle, and one of said electrical accessories includes a connector element, a complementary connector element is fixed to a roof of said vehicle and connected by conductors to an electrical power supply circuit of said vehicle and said elements include contacts adapted to be pressed together after insertion of said main ribbon conductor in order to supply power thereto.

* * * * *